United States Patent [19]

Ishii et al.

[11] Patent Number: 5,067,010
[45] Date of Patent: Nov. 19, 1991

[54] COLOR VIDEO SIGNAL PROCESSING DEVICE WITH ENCODING AND COMPRESSION

[75] Inventors: Yoshiki Ishii, Hadano; Makoto Shimokoriyama, Zama, both of Japan

[73] Assignee: Canon Kabushiki Kaisha, Tokyo, Japan

[21] Appl. No.: 334,196

[22] Filed: Apr. 6, 1989

[30] Foreign Application Priority Data

| Apr. 11, 1988 | [JP] | Japan | 63-90105 |
| Apr. 11, 1988 | [JP] | Japan | 63-90106 |
| Apr. 11, 1988 | [JP] | Japan | 63-90107 |
| Apr. 11, 1988 | [JP] | Japan | 63-90108 |
| Apr. 12, 1988 | [JP] | Japan | 63-89539 |
| Apr. 13, 1988 | [JP] | Japan | 63-90799 |

[51] Int. Cl.$^5$ .................................... H04N 11/04
[52] U.S. Cl. ........................................ 358/13
[58] Field of Search ............................ 358/13

[56] References Cited

U.S. PATENT DOCUMENTS

| 4,302,775 | 11/1981 | Widergren | 358/13 |
| 4,635,098 | 1/1987 | Thong | 358/14 |
| 4,764,805 | 8/1988 | Rabbani et al. | 358/13 |
| 4,797,729 | 1/1989 | Tsai | 358/13 |

FOREIGN PATENT DOCUMENTS

| 37792 | 3/1984 | Japan | 358/13 |
| 45790 | 3/1984 | Japan | 358/13 |

OTHER PUBLICATIONS

Pratt, Spatial Transform Coding of Color Image, IEEE Transactions on Cummunication Technology, vol. COM-19, No. 6, Dec. 1971, pp. 980–991.

Primary Examiner—John W. Shepperd
Attorney, Agent, or Firm—Fitzpatrick, Cella, Harper & Scinto

[57] ABSTRACT

There is provided a color video signal processing device in which pixels are thinned out for a whole picture plane with respect to each of two kinds of digital color difference signals in accordance with a predetermined role. The encoding is executed on a unit basis of a block consisting of (n×m) samples where (n and m are integers no less than 2) which are formed with respect to each of the two kinds of color difference signals whose pixels have been thinned out or a block consisting of (n×m) samples formed so as to include both of the two kinds of color difference signals whose pixels had been thinned out. The data compression is executed on a block unit basis.

21 Claims, 12 Drawing Sheets

○ : Cw
△ : CN
× : THINNED OUT SAMPLE POINT

○ : Cw
△ : CN
× : THINNED OUT SAMPLE POINT

○ : Cw
△ : CN

○ : Cw
△ : CN

COLOR VIDEO SIGNAL PROCESSING DEVICE WITH ENCODING AND COMPRESSION

BACKGROUND OF THE INVENTION

1. Field of the Invention

The present invention relates to a color video signal processing device and, more particularly, to a color video signal processing device for performing the encoding on a block unit basis of (n × m) samples (n and m being integers of 2 or more).

2. Related Background Art

In general, in a color video signal consisting of a luminance signal and two kinds of color difference signals, the band of the color difference signals is narrower than the band of the luminance signal and the sampling frequency upon digitization is also set to about ¼ of the sampling frequency of the luminance signal.

Further, when considering the visual characteristic on a screen, even when the information amount of a chrominance signal is further compressed as compared with the information amount of the luminance signal, the deterioration in picture quality is inconspicuous. However, even if the sampling frequency of the color difference signal is simply further reduced, the deterioration in resolution in the horizontal direction becomes conspicuous.

Therefore, hitherto, there has been proposed a method whereby the information amount is reduced by half by line sequencing two kinds of color difference signals ($C_N$, $C_W$) or a method whereby the information amount is reduced by half by an offset subsampling such that pixels shifted between lines or fields are transmitted and thinned out to the other pixels.

On the other hand, in recent years, the video signal has further become finer and finer and a test of what is called a HD (High Definition) television signal having 1000 or more scanning lines has also been executed. Consequently, there is a tendency for the information amount of the video signal further to increase. In the case of considering the limitation of the transmitting rate of a transmission path, the information amount must be further compressed. For this purpose, various kinds of highly efficient encoding systems have been proposed.

As an example of the highly efficient encoding systems, there has been known a block encoding in which one picture plane is divided into a plurality of encoding blocks each consisting of (n × m) sample points and information is compressed by using the correlation among the pixels in each block without causing the picture quality to be deteriorated. According to such a block encoding, since the encoding can be executed by using the pixels having the highest correlation, it is advantageous in terms of the deterioration in picture quality remaining small and the propagation of code errors being suppressed only in each block.

SUMMARY OF THE INVENTION

Under the background as mentioned above, it is an object of the present invention to provide a novel color video signal processing method whereby in the case where a component video signal consisting of two kinds of color difference signals and a luminance signal is transmitted or recorded/reproduced, the two kinds of color difference signals can be also efficiently encoded on a block unit basis.

Under such an object, according to the present invention, as one embodiment, there is disclosed a color video signal processing device comprising: (a) color thinning-out means for thinning out pixels for a whole picture plane with respect to each of two kinds of digital color difference signals in accordance with a predetermined rule; (b) color blocking means for forming color blocks each consisting of (n × m) pixels (n and m are integers of not less than 2) with respect to each of the two kinds of color difference signals whose pixels were thinned out by the thinning-out means; and (c) color encoding means for encoding on the color block unit basis and for compressing data on the color block unit basis.

On the other hand, according to the invention, as another embodiment, there is disclosed a color video signal processing device comprising: (a) color thinning-out means for thinning out pixels for a whole picture plane with respect to each of two kinds of digital color difference signals in accordance with a predetermined rule; (b) color blocking means for forming color blocks each consisting of (n × m) pixels (n and m are integers not less than 2) and each having the pixels of both of the two kinds of color difference signals whose pixels were thinned out by the thinning-out means; and (c) color encoding means for encoding on the color block unit basis and for compressing data on the color block unit basis.

The above and other objects and features of the present invention will become apparent from the following detailed description and the appended claims with reference to the accompanying drawings.

DESCRIPTION OF THE PREFERRED EMBODIMENTS

An embodiment of the present invention will be described hereinbelow.

Figure 1:
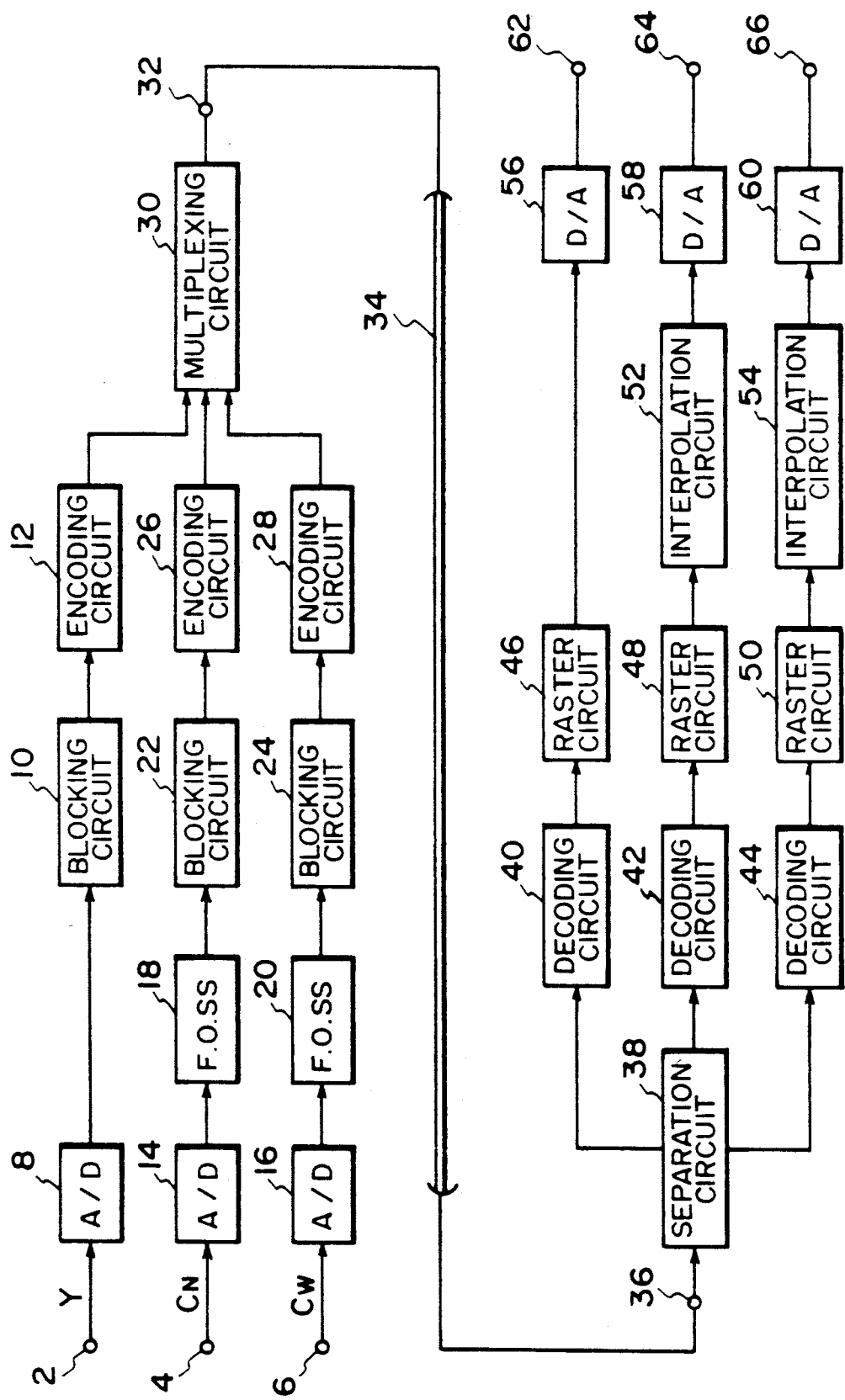
FIG. 1 is a diagram showing a schematic construction of a color video signal transmission system as an embodiment of the present invention.

FIG. 1 is a diagram showing a schematic construction of a color video signal transmission system as an embodiment of the invention. In the diagram, reference numeral 2 denotes an input terminal of a luminance signal (Y) and 4 and 6 indicate input terminals of color difference signals ($C_N$, $C_W$), respectively. The input luminance signal is sampled by an A/D converter 8 and input to a blocking circuit 10. The blocking circuit 10 reads a digital luminance signal based on the raster scanning order on a block unit basis of (4×4) pixels.

Figure 2:
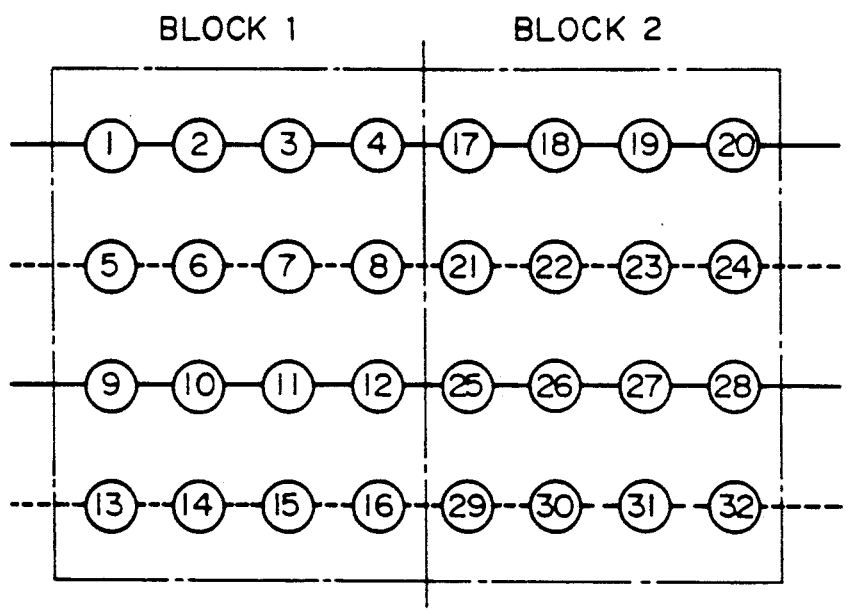
FIG. 2 is a diagram for explaining the operation of a blocking circuit in FIG. 1.

FIG. 2 is a diagram for explaining the operation of the blocking circuit. In the diagram, solid lines denote scanning lines of the first field, broken lines indicate scanning lines of the second field, and an alternate long and short dash line represents a boundary between blocks. That is, the data input in the order 1→2→3→4→17→18→19 →20→ . . . →9→10→11→12→25→26→2→28→ . . . (with the pixel numbers shown in the FIG. in 0) is output from the blocking circuit 10 in the order 1→2→3→4→5→6→7→8→9 → . . . .

An encoding circuit 12 block encodes the data read out of the blocking circuit 10 and reduces the information amount (the number of bits per pixel) and, thereafter, outputs the data.

Figure 3:
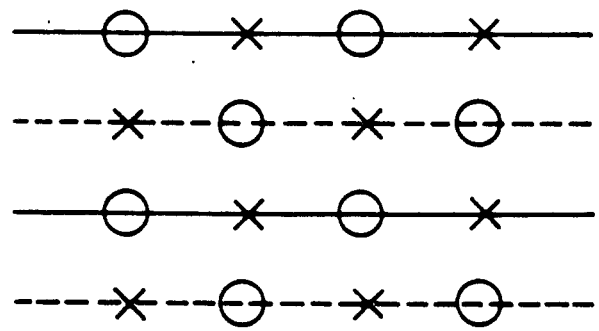
FIG. 3 is a diagram showing the positional relation between the output pixels and the thinned out pixels due to a field offset subsampling circuit.

On the other hand, the color difference signals $C_N$ and $C_W$ input from the input terminals 4 and 6 are respectively converted into digital signals by the sampling clock whose frequency is ¼ of a sampling frequency of the luminance signal, by A/D converters 14 and 16. The digitized color difference signals $C_N$ and $C_W$ are subsampled by field offset subsampling circuits (FOSS's) 18 and 20 at the next stage. FIG. 3 shows the positional relation between the output pixels and the thinned-out pixels in the FOSS's 18 and 20. In FIG. 3 as well, solid lines indicate scanning lines of the first field, broken lines denote scanning lines of the second field, ○ represents pixels which are transmitted to the next stage, and X indicates thinned-out pixels. The interval between pixels is obviously four times that in the luminance signal.

The subsampled color difference signals $C_N$ and $C_W$ are respectively supplied to blocking circuits 22 and 24 in accordance with the raster scanning order. After the color difference signals are rearranged every block in a manner similar to the case of the blocking circuit 10, the rearranged signals are supplied to encoding circuits 26 and 28.

The color difference signals $C_N$ and $C_W$ which were block encoded by the encoding circuits 26 and 28 are time base multiplexed with the block encoded luminance signal by a multiplexing circuit 30. The time base multiplexed signal is transmitted to a transmission path 34 of a communicating apparatus, magnetic recording-/reproducing apparatus, or the like through a terminal 32.

Figure 4A:
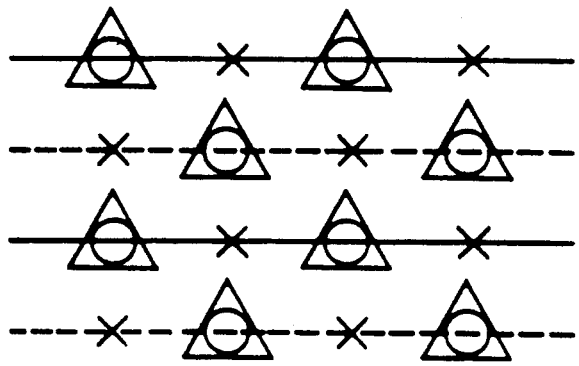
FIGS. 4(a) and 4(b) are diagrams showing the positional relations among the transmission pixels of color difference signals $C_N$ and $C_W$, respectively.
Figure 4B:
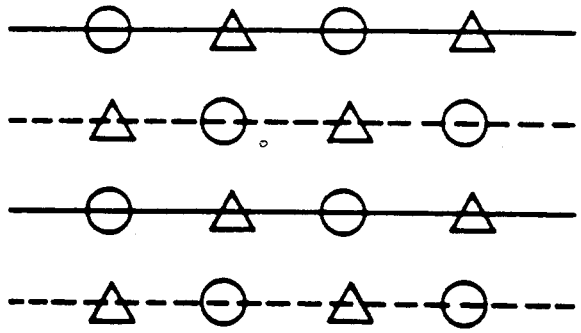

The transmission pixels of the color difference signals $C_N$ and $C_W$ in the FOSS's 18 and 20 may be the same as shown in FIG. 4(a) or may be different as shown in FIG. 4(b). In FIG. 4(a) and 4(b) ○ denotes the transmission pixels of the $C_N$, △ indicates the transmission pixels of the $C_W$, and X represents pixels to be thinned out for both of the $C_N$ and $C_W$. On the other hand, as a block encoding system, it is possible to use an encoding system using the correlation in the block, such as orthogonal transformation encoding vector quantization, encoding in which quantization indices obtained by the linear quantization of the pixels between the maximum and minimum values in the block every pixel are transmitted, or the like.

According to the construction as mentioned above, since the subsampled color difference signals are block encoded, information can be compressed at a high compression rate and only the same kind of pixels exist in each of the encoding blocks, so that highly efficient band compression can be executed. Further, by allowing the encoding circuits 26 and 28 to execute encoding processes suitable for the $C_N$ and $C_W$, still more efficient compression can be also realized.

The decoding system will now be described.

The color video signal through the transmission path 34 is supplied to a separation circuit 38 through a terminal 36 and is separated into the luminance signal and color difference signals $C_N$ and $C_W$. These signals are supplied to block decoding circuits 40, 42, and 44 and are decoded by decoding processes opposite to the encoding processes executed in the encoding circuits 12, 26, and 28, thereby restoring the information amount to the original information amount. The decoded luminance signal and color difference signals $C_N$ and $C_W$ are respectively rearranged by raster circuits 46, 48, and 50 from the order of the blocks to the order of the scanning lines.

The raster color difference signals $C_N$ and $C_W$ are interpolated with the thinned-out pixels by interpolation circuits 52 and 54 and, thereafter, they are input to D/A converters 58 and 60, respectively. For the luminance signal, the output of the raster circuit 46 is directly supplied to a D/A converter 56. At this time, the operating frequency of the D/A converter 56 is four times as high as the operating frequencies of the D/A converters 58 and 60. The analog luminance signal and analog color difference signals $C_N$ and $C_W$ from the D/A converters 56, 58, and 60 are output as component color video signals from terminals 62, 64, and 66.

Although the field offset subsampling has been used as a subsampling pattern in this embodiment, the subsampling pattern is not limited to it. It is also possible to use sampling patterns which are different every signal.

On the other hand, although this embodiment has been described with respect to the case where the encoding block is set to the size of (4×4) pixels, a similar effect is generally also obtained in the case of the (n×m) pixels (where n and m are integers not less than 2). The values of n and m can be arbitrarily set in accordance with the requirements of the encoding system, data compression rate, and the like.

As described above, according to the above embodiment, a color video signal processing method whereby information can be compressed at an extremely high compression rate with respect to the color difference signals without deteriorating the picture quality is obtained.

Figure 5:
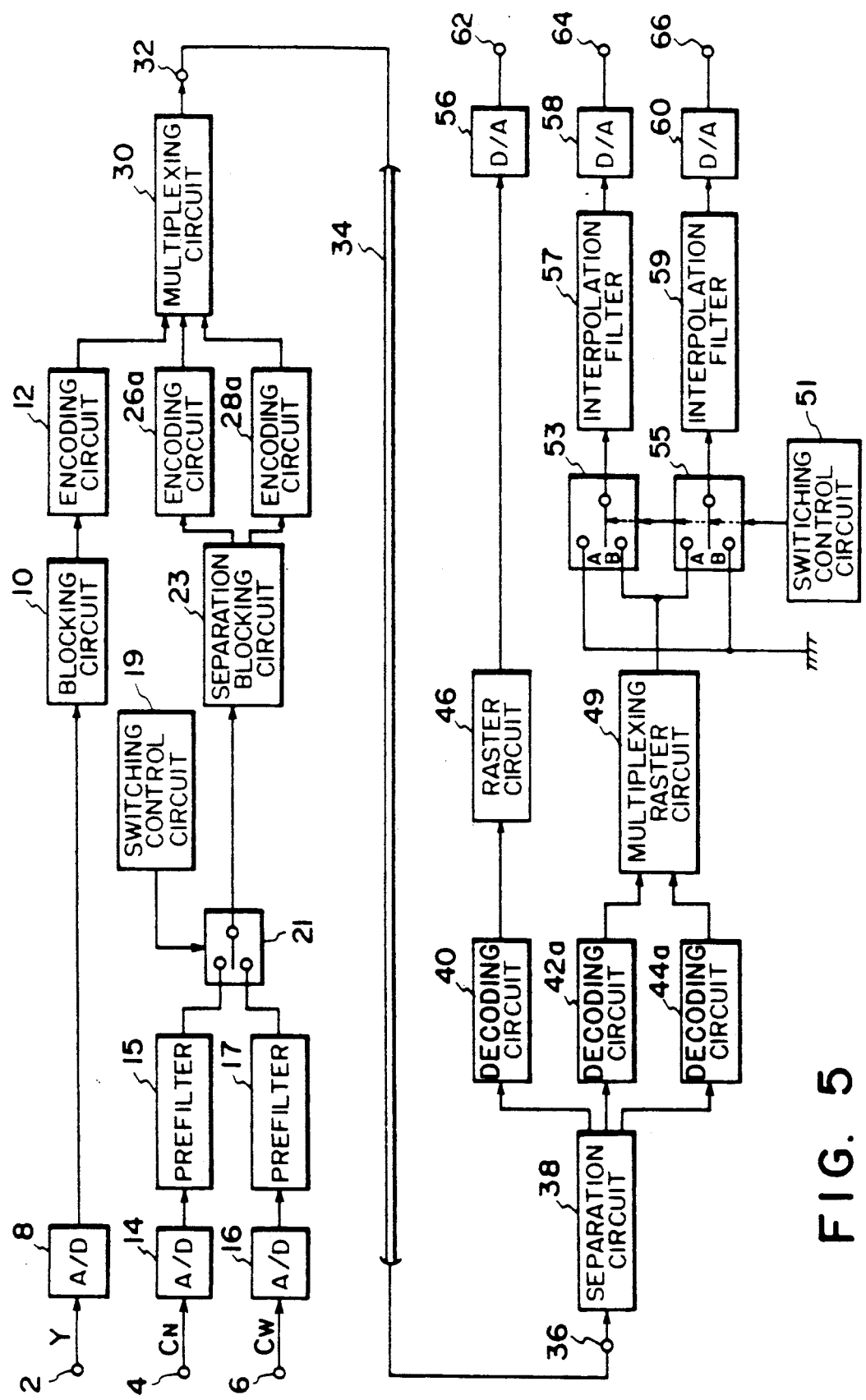
FIG. 5 is a diagram showing a schematic construction of a color video signal transmission system as another embodiment of the invention.

FIG. 5 is a diagram showing a schematic construction of a color video signal transmission system as another embodiment of the invention. In the diagram, the same parts and components as those in the system shown in FIG. 1 are designated by the same reference numerals.

Since the processing system of the luminance signal is quite the same as that in FIG. 1, its description is omitted.

Figure 6:
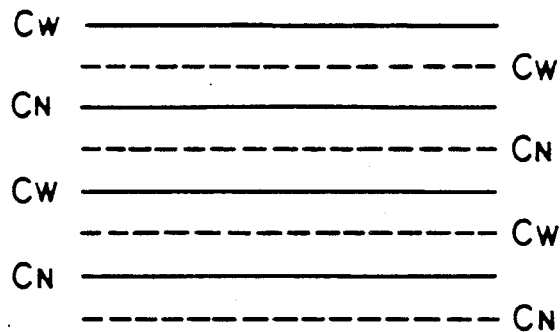
FIG. 6 is a diagram showing an arrangement of color difference signals on the screen of line sequenced signals.

The color difference signals $C_N$ and $C_W$ which were digitized by the sampling clock of the frequency which is $\frac{1}{4}$ of the sampling frequency of the luminance signal by the A/D converters 14 and 16 are supplied to prefilters 15 and 17 at the next stage, thereby limiting the frequency in the vertical direction. The color difference signals $C_N$ and $C_W$ which are output from the prefilters 15 and 17 are line sequenced by a switch 21 in response to a rectangular wave signal which is output from a switching control circuit 19 and is inverted every horizontal scanning period. FIG. 6 shows an arrangement of the color difference signals $C_N$ and $C_W$ on the screen in the line sequenced signals. In the diagram, solid lines denote scanning lines of the first field and broken lines indicate scanning lines of the second field. As shown in the diagram, the signals $C_N$ and $C_W$ are arranged on a two-line unit basis in each frame.

The line sequenced color difference signals $C_N$ and $C_W$ are supplied to a separation blocking circuit 23. The operation of the separation blocking circuit 23 will now be described with reference to FIG. 7. The color difference signals which were line sequenced by the switch 21 are input to the separation blocking circuit 23 in the order 1→2→3→4→33→34→35→36→ . . . 17→18→19→20→ . . . →9→10→11→12→ . . . (with the pixel numbers shown in the FIG. in 0) in FIG. 7. The separation blocking circuit 23 separates the line sequenced color difference signals into the two kinds of signals $C_N$ and $C_W$ and reduces the data transmission rate to $\frac{1}{2}$. The signal of the $C_N$ system is supplied to an encoding circuit 26a in the order 17→18→19→20→21→22→23→24→25→26→27 28→29→30→31→32→ . . . . The signal of the $C_W$ system is supplied to an encoding circuit 28a in the order 1→2→3→4→5→6→7 8→9→10→11→12→13→14→15→16→ . . . .

Although the interval between pixels in the horizontal direction and the interval between pixels in the vertical direction are different from those in the case of the luminance signal, the encoding circuits 26a and 28a execute the encoding processes using the correlation in an encoding block of (4×4) pixels. That is, the encoding circuit 26a executes the encoding using the correlation in each block in which sixteen pixels, of the pixel numbers 17 to 32 in FIG. 7 construct one encoding block. The encoding circuit 28a likewise executes the encoding using the correlation in each block in which 16 pixels, of the pixel numbers 1 to 16 in FIG. 7, construct one encoding block.

The color difference signals which are block encoded by the encoding circuits are time base multiplexed with the block encoded luminance signal by the multiplexing circuit 30 and the multiplexed signal is transmitted to the transmission path 34 of a communicating apparatus, magnetic recording/reproducing apparatus, or the like through the terminal 32.

Figure 8:
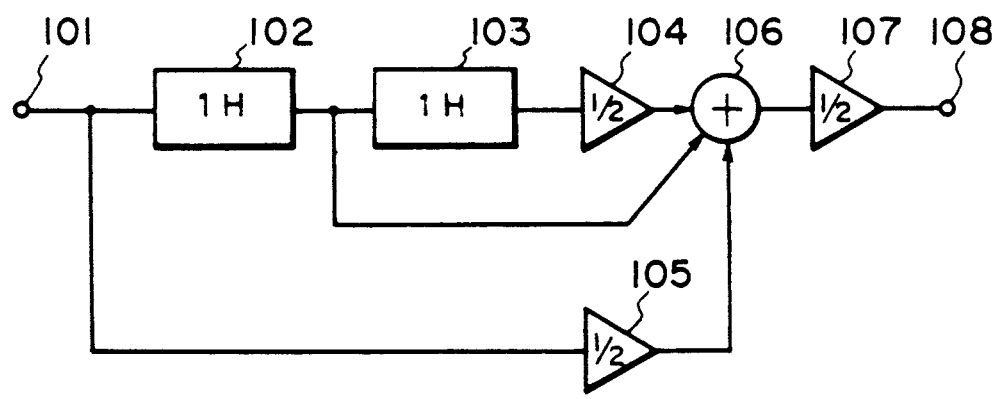
FIG. 8 is a diagram showing a construction of a prefilter in FIG. 5.

FIG. 8 shows an example of a construction of the prefilter in the foregoing system. In the diagram, reference numeral 101 denotes an input terminal; 102 and 103 indicate delay circuits of one horizontal scanning period (1H); 104, 105 and 107 are $\frac{1}{2}$ coefficient devices; 106 an adder; and 108 an output terminal. The highest frequency in the vertical direction is limited to about $\frac{1}{2}$ by the prefilter.

As a block encoding system, similarly to the system of FIG. 1, it is possible to use an encoding system using the correlation in a block, such as orthogonal transformation encoding, vector quantization, encoding in which quantization indices obtained by the linear quantization of the pixels between the maximum and minimum values in the block every pixels are transmitted, or the like.

According to the construction mentioned above, since the line sequenced color difference signals have been block encoded, information can be compressed at a high compression rate. On the other hand, since only the same kind of pixels exist in each block, band compression of a high efficiency can be executed. Further, by allowing the encoding circuits 26a and 28a to execute encoding processes suitable for the $C_N$ and $C_W$, the further highly efficient compression can be also realized.

The decoding system will now be described.

With respect to the decoding system, the processes of the luminance signal separated by the separation circuit 38 are similar to those in the system of FIG. 1.

The color difference signals $C_N$ and $C_W$ decoded by decoding circuit 42a and 44a are supplied to a multiplexing raster circuit 49 and are rearranged into the line sequential color difference signals in accordance with the procedure opposite to that in the separation blocking circuit 23.

The raster line sequential color difference signals are supplied to a B input terminal of a switch 53 and an A input terminal of a switch 54. A switching control circuit 50 supplies a rectangular wave which is inverted every horizontal scanning period to the switches 53 and 54. The line sequential color difference signal $C_N$ which is output from the raster circuit 49 is supplied to an interpolation filter 57. The line sequential color difference signal $C_W$ from the raster circuit 49 is supplied to an interpolation filter 59. At this time, data of all 0's corresponding to the 0 level is supplied to the interpolation filter 57 for a horizontal scanning period when no $C_N$ signal exists. Data of all 0's corresponding to the 0 level is supplied to the interpolation filter 59 for a horizontal scanning period when no $C_W$ signal exists.

Although the construction of each of the interpolation filters 57 and 59 is similar to that of the filter shown in FIG. 4, since the data of one of two lines is substituted for the data corresponding to the 0 level, the average level has been attenuated to $\frac{1}{2}$ at this time point, so that the $\frac{1}{2}$ coefficient device 107 is unnecessary. The line sequential signals are separated into the two kinds of color difference signals $C_N$ and $C_W$ by the interpolation filters 57 and 59. The color difference signals are input to the D/A converters 58 and 60, respectively. For the luminance signal, the output of the raster circuit 46 is directly supplied to the D/A converter 56.

In the system of this embodiment as well, in a manner similar to the system of FIG. 1, the color difference signals can also be encoded at an extremely high compression rate and the deterioration in picture quality can be suppressed. On the other hand, it is also possible to perform modifications or the like similarly to the system of FIG. 1.

Figure 9:
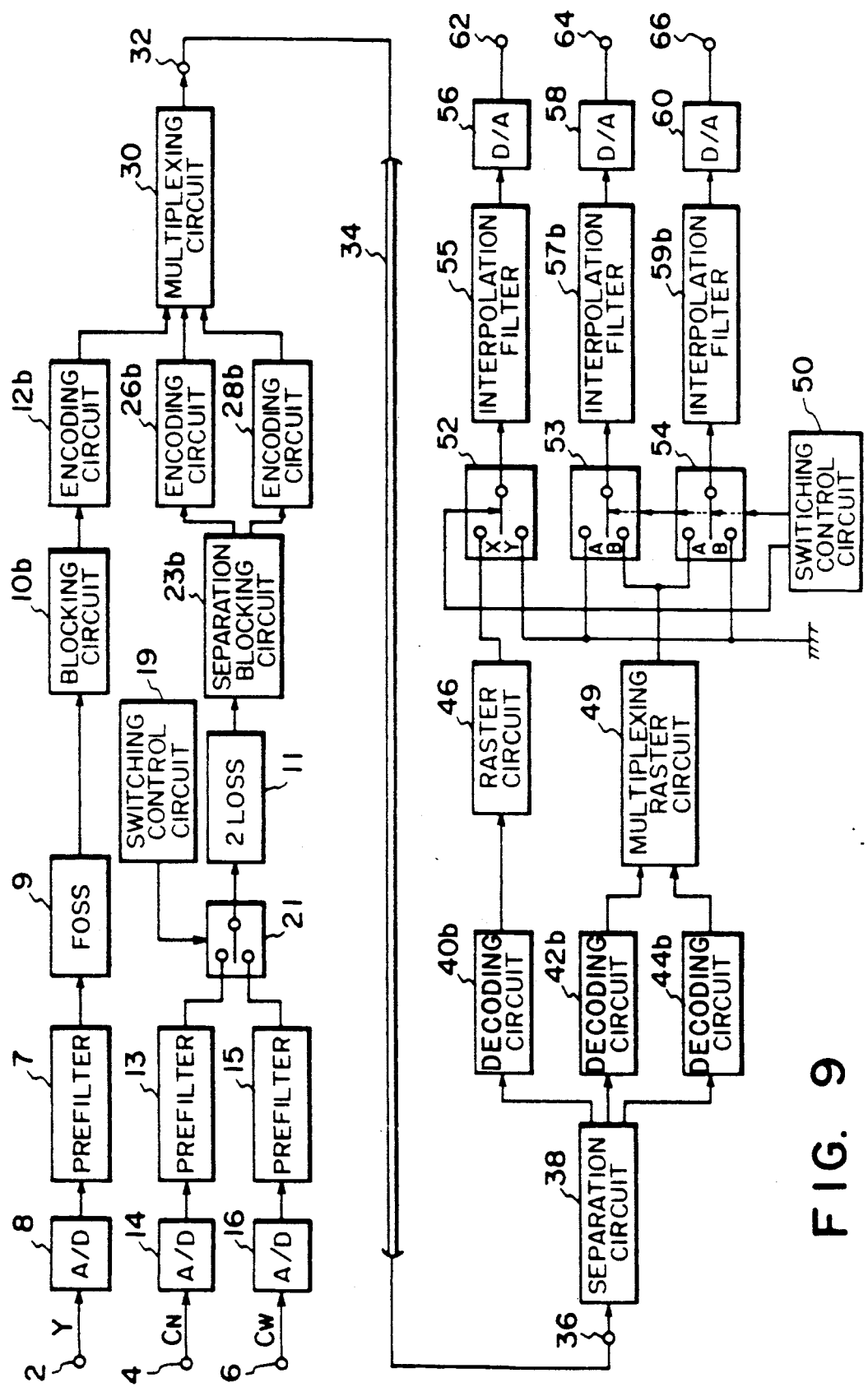
FIG. 9 is a diagram showing a schematic construction of a color video signal transmission system as still another embodiment of the invention.

FIG. 9 is a diagram showing a schematic construction of a color video signal transmission system as still another embodiment of the invention. In the diagram, the same parts and components as those in the system which has already been described are designated by the same reference numerals and their descriptions are omitted.

After the luminance signal Y is A/D converted by the A/D converter 8, the band is limited by a prefilter 7 so as not to cause the folded noises in a field offset subsampling (FOSS) circuit 9 at the post stage. The luminance signal from the prefilter 7 is subsampled by the FOSS circuit 9. The positional relation between the output pixels and the thinned-out pixels in the FOSS circuit 9 may be set in a manner similar to that shown in, for instance, FIG. 3.

The luminance signal from the FOSS circuit 9 is supplied to a blocking circuit 10b. The blocking circuit 10b fundamentally operates in a manner similar to that of the blocking circuit 10 in the system of FIGS. 1 and 3 except that the band of the input data only differs from that of the blocking circuit 10. An encoding circuit 12b block encodes the data read out of the blocking circuit 10b and reduces the information amount (the number of bits per pixel) and, thereafter, outputs the data.

On the other hand, the digitized color difference signals $C_N$ and $C_W$ are supplied to prefilters 13 and 15 at the next stage and the frequency band is two-dimensionally limited so as not to generate foldover interference in the line sequencing circuit and subsampling circuit at the post stage.

The color difference signals $C_N$ and $C_W$ which are output from the prefilters 13 and 15 are line sequenced by the switch 21.

Figure 10:
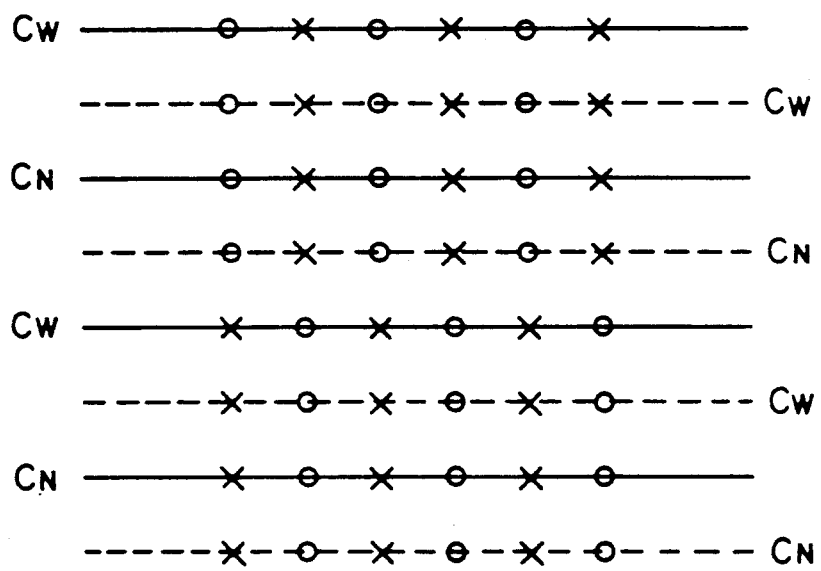
FIG. 10 is a diagram showing the positional relation between the output pixels and the thinned-out pixels due to a two-line offset subsampling circuit for color difference signals.

The line sequential color difference signal which is output from the switch 21 is supplied to a 2-line, offset subsampling (2LOSS) circuit 11 and subsampled so as to make the horizontal positions of the output pixels different every two lines. FIG. 10 shows the positional relation between the output pixels and the thinned-out pixels in the 2LOSS circuit 11. In the 2LOSS circuit 11, as shown in the diagram, with respect to the scanning lines in one frame, the output pixels are offset every four lines. However, when considering only the same color difference signals of each field, the output pixels are offset every line.

An output of the 2LOSS circuit 11 is supplied to a separation blocking circuit 23b and the blocking process is executed with regard to each of the color difference signals $C_N$ and $C_W$.

Figure 7:
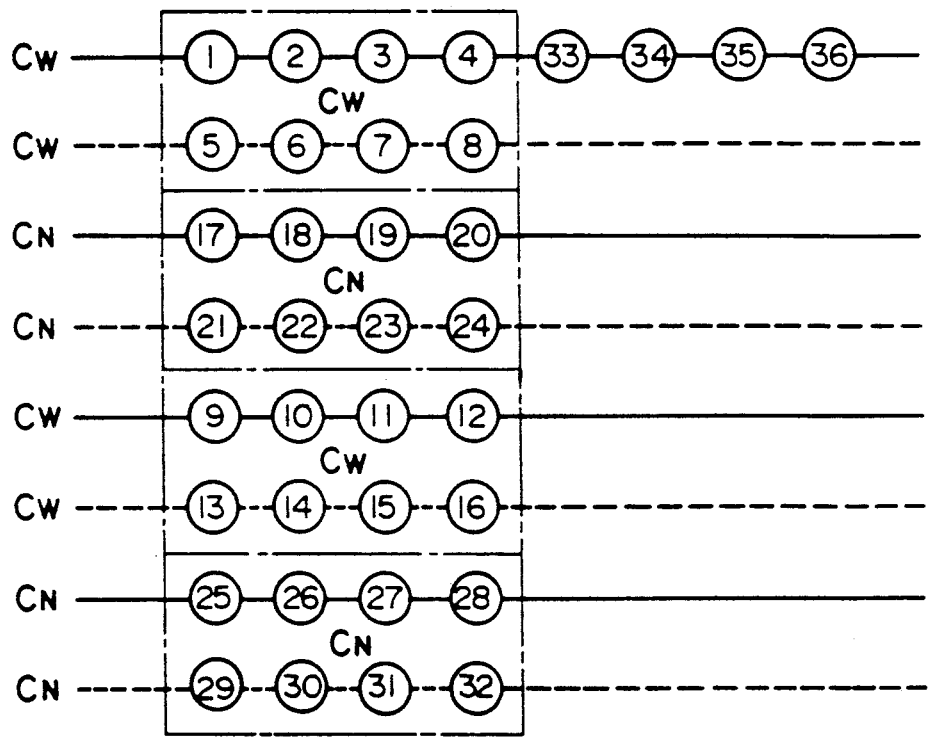
FIG. 7 is a diagram for explaining the operation of a separation blocking circuit in FIG. 5.

The above operation is similar to that of the system of FIG. 5 except that the pixels shown in ○ in FIG. 7 become the output pixels of the 2LOSS circuit 11.

The color difference signals $C_N$ and $C_W$ which were block encoded by the encoding circuits 26b and 28b are time base multiplexed with the block encoded luminance signal by the multiplexing circuit 30. The time base multiplexed signal is transmitted to the transmission path 34 of a communicating apparatus, magnetic recording/reproducing apparatus, or the like through the terminal 32.

The decoding system of FIG. 9 will now be described.

The color video signal transmitted through the transmission path 34 is supplied to the separation circuit 38 through the terminal 36 and is separated into the luminance signal Y and color difference signals $C_N$ and $C_W$. The separated signals Y, $C_N$, and $C_W$ are supplied to block decoding circuits 40b, 42b, and 44b, respectively, and decoded by the decoding processes opposite to the encoding processes executed in the encoding circuit 12b, 26b, and 28b, thereby restoring the information amount to the original information amount. The decoded luminance signal is rearranged by a raster circuit 46 from the order of the blocks to the order of the scanning lines.

The raster luminance signal is supplied to an x side terminal of a switch 52. A switching control circuit 50 supplies to the switch 52 a rectangular wave signal which is inverted every sampling period of the A/D converter 8. The switch 52 alternately outputs the raster luminance signal data and the data corresponding to the 0 level and inputs to an interpolation filter 55. The interpolation filter 55 interpolates the thinned-out pixels by using one- or two-dimensional correlation.

On the other hand, the decoded color difference signals $C_N$ and $C_W$ are supplied to the multiplexing raster circuit 49 and are rearranged into the line sequential color difference signal by the procedure opposite to the process executed in the separation blocking circuit 23.

The raster line sequential color difference signal is supplied to a B input terminal of the switch 53 and to an A input terminal of the switch 54. The switching control circuit 50 supplies to the switches 53 and 54 every horizontal scanning period a rectangular wave signal which is inverted every sampling period of the A/D converters 14 and 16. The $C_N$ signal in the line sequential color difference signal which is output from the multiplexing raster circuit 49 is supplied to an interpolation filter 57b and the $C_W$ signal in the line sequential color difference signal is supplied to an interpolation filter 59b. At this time, data of all 0's corresponding to the 0 level is supplied to the interpolation filter 57b for the sampling period and the horizontal scanning period when no $C_N$ signal exists. Data of all 0's corresponding to the 0 level is supplied to the interpolation filter 59b for the sampling period and the horizontal scanning period when no $C_W$ signal exists.

With respect to the thinned-out pixels and the thinned-out horizontal scanning lines, the interpolation filters 57b and 59b execute the interpolating processes in the vertical and horizontal directions and output signals as two kinds of color difference signals $C_N$ and $C_W$.

The luminance signal and color difference signal $C_N$ and $C_W$ which were converted into the analog signals by the D/A converters 56, 58, and 60 are output as a component color video signal from the terminals 62, 64, and 66.

In the above embodiment, field offset subsampling has been used as a subsampling pattern of the luminance signal and 2-line offset subsampling has been used as a subsampling pattern of the color difference signals. However, the subsampling patterns are not limited to these two. It is also possible to use sampling patterns which differ every color difference signal.

In the system of this embodiment, in a manner similar to the system of FIG. 1, the color difference signal can be encoded by an extremely high compression rate and the deterioration in picture quality can be also suppressed. In addition, similarly to the system of FIG. 1, it is also possible to perform modifications or the like.

Figure 11:
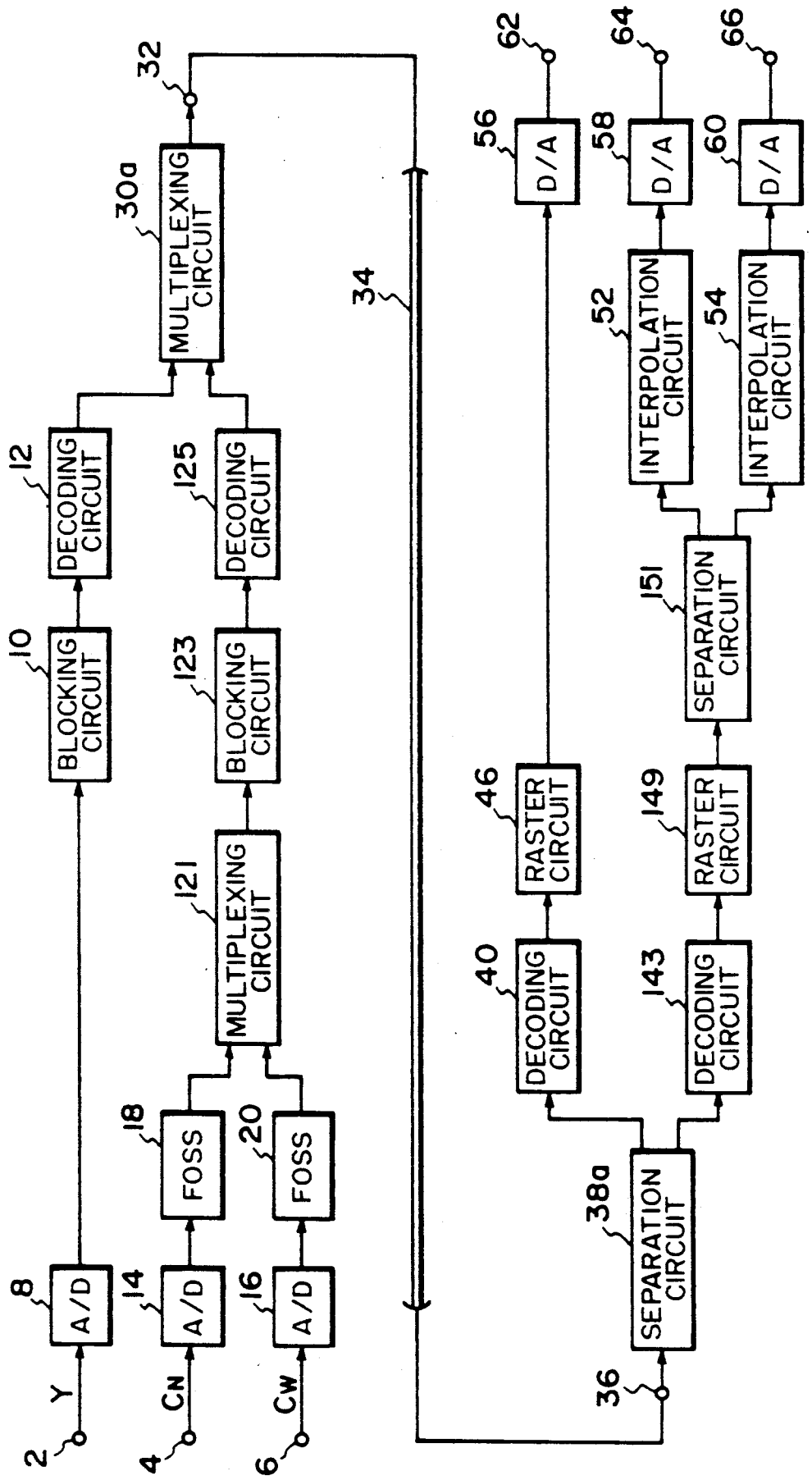
FIG. 11 is a diagram showing a schematic construction of a color video signal transmission system as still another embodiment of the invention.

FIG. 11 is a diagram showing a schematic construction of a color video signal transmission system as still another embodiment of the invention. In the diagram, the same parts and components as those in the system shown in FIG. 1 are designated by the same reference numerals and their descriptions are omitted.

Outputs of FOSS's 18 and 20 are supplied to a multiplexing circuit 121 and multiplexed. Even in the case of multiplexing the signals $C_N$ and $C_W$ in the same pixels as shown in FIG. 4(a), they are time base multiplexed.

Consequently, a data series similar to that in the case of alternately transmitting the $C_N$ and $C_W$ in the shifted pixels as shown in FIG. 4(b) is output from the multiplexing circuit 121.

The multiplexed signal of $C_N$ and $C_W$ which is output from the multiplexing circuit 121 is supplied to a blocking circuit 123 and rearranged every block including the $C_N$ and $C_W$ in a manner similar to the case of the blocking circuit 10 and supplied to an encoding circuit 125.

The multiplexed signal of the color difference signals $C_N$ and $C_W$ which was block encoded by the encoding circuit 125 is further time base multiplexed with the block encoded luminance signal by a multiplexing circuit 30a. The time base multiplexed signal is transmitted to the transmission path 34 of a communicating apparatus, magnetic recording/reproducing apparatus, or the like through the terminal 32.

According to the above described structure, since the sampled color difference signals are block encoded, information can be composed at a high compression rate and the size of each encoding block is not so large. In this case, both signals $C_N$ and $C_W$ are included in one block and these signals are simultaneously block encoded. However, in general, there is a high correlation between the color difference signals $C_N$ and $C_W$. By reducing the size of block, the correlation among sample points in the block can be raised.

The decoding system will now be described.

The color video signal transmitted through the transmission path 34 is supplied to a separation circuit 38a through the terminal 36 and separated into the luminance signal and the multiplexed signal of the color difference signals $C_N$ and $C_W$. The separated signals are supplied to block decoding circuits 40 and 143 and decoded by the decoding processes opposite to the encoding processes executed in the encoding circuit 12 and 25, thereby restoring the information amount to the original amount. The decoded luminance signal and the decoded multiplexed signal of the color difference signals $C_N$ and $C_W$ are rearranged from the order of the blocks to the order of the scanning lines by raster circuit 46 and 149, respectively.

The raster color difference multiplexed signal is separated into the signals $C_N$ and $C_W$ by a color difference separation circuit 151. The separated color difference signals $C_N$ and $C_W$ are interpolated with the thinned-out pixels by the interpolation circuit 52 and 54 and, thereafter, they are input to the D/A converters 58 and 60 and are output as component color video signal signals from the terminals 62, 64, and 66.

Figure 12:
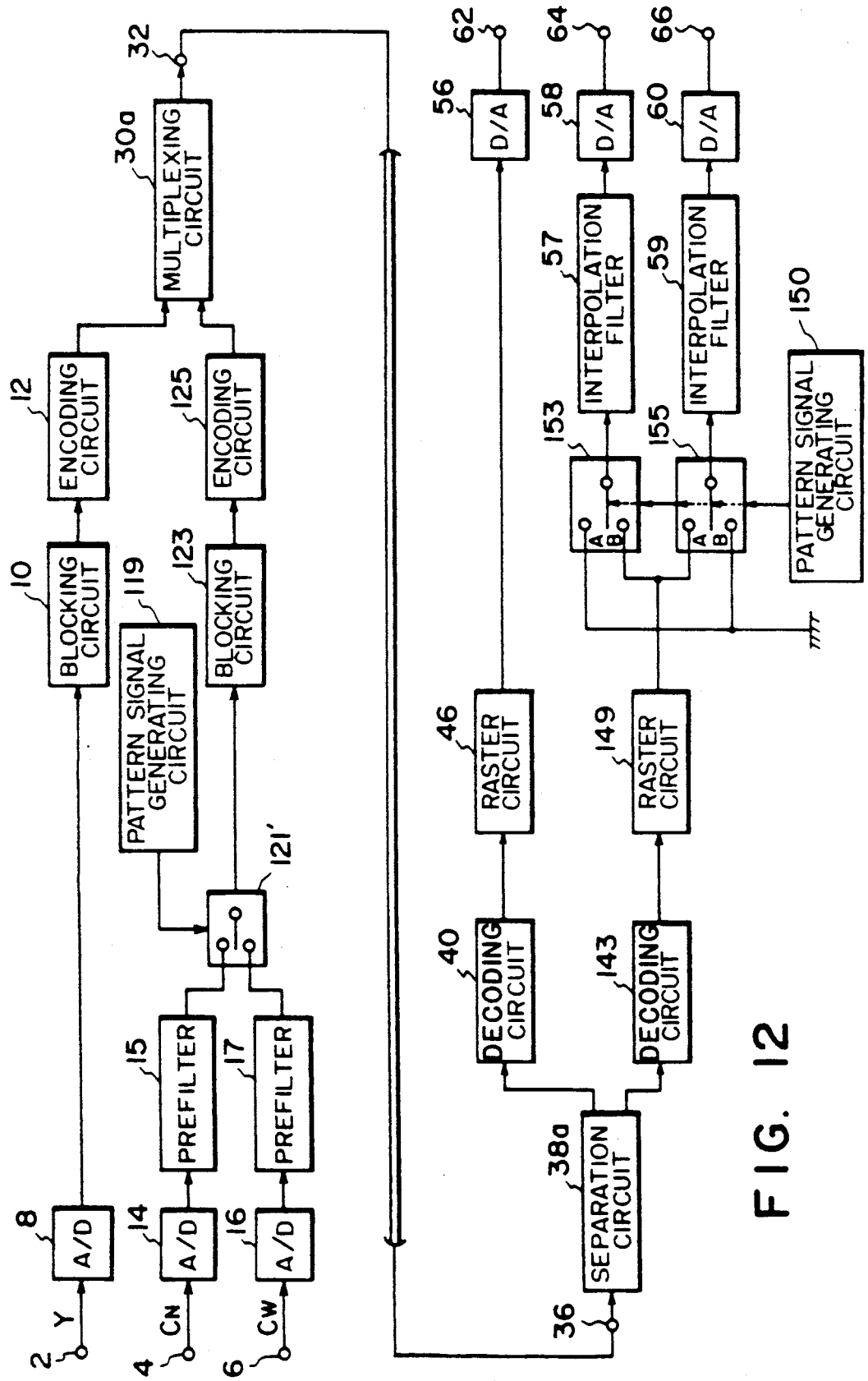
FIG. 12 is a diagram showing a schematic construction of a color video signal transmission system as yet another embodiment of the invention.

FIG. 12 is a diagram showing a construction of a color video signal transmission system as another embodiment of the invention. In the system of FIG. 12, a part of the system construction of FIG. 11 is modified. In FIG. 12, the same parts and components as those shown in FIG. 11 are designated by the same reference numerals and their descriptions are omitted.

In FIG. 12, the color difference signals $C_N$ and $C_W$ output from the A/D converters 14 and 16 are supplied to the prefilters 15 and 17 and the frequency band is limited in correspondence to the pixel thinning out pattern at the post stage. Such a process is executed to prevent the interference due to the foldover of the spectrum as is well known. The color difference signals $C_N$ and $C_W$ output from the prefilters 15 and 17 are supplied to two input terminals of a data selector 121' and are selectively output therefrom in accordance with a subsampling pattern signal which is generated from a pattern signal generating circuit 119. For instance, in the case of outputting the pixels of the $C_N$ and $C_W$ as shown in FIG. 4(b), a pattern signal which is inverted every sampling period is used so that the data selector 121' switches the output data every sampling period of the color difference signals. On the other hand, the multiplexed signal of the color difference signals $C_N$ and $C_W$ which is output from the raster circuit 149 is supplied to a B side terminal of a data selector 153 and to an A side terminal of a data selector 155, respectively. On the other hand, the "0" sample data is supplied to an A side terminal of the data selector 153 and to a B side terminal of the data selector 155. The data selectors 153 and 155 are controlled by an output from a pattern signal generating circuit 150 to generate the same pattern signal as the pattern signal which is output from the pattern signal generating circuit 119. When the data selector 153 outputs the input signal on the A side, the data selector 155 also outputs the input signal on the A side. That is, the signals which are output from the data selectors 153 and 155 are the color difference signals $C_N$ and $C_W$ in which the thinned-out pixels have been replaced to the "0" samples. By supplying the color difference signals $C_N$ and $C_W$ to the interpolation filters 57 and 59 to perform the same band limiting processes as those executed by the prefilters 15 and 17, the original signals are reproduced. With such a construction, an effect similar to that in the system of FIG. 11 is also derived.

Figure 13A:
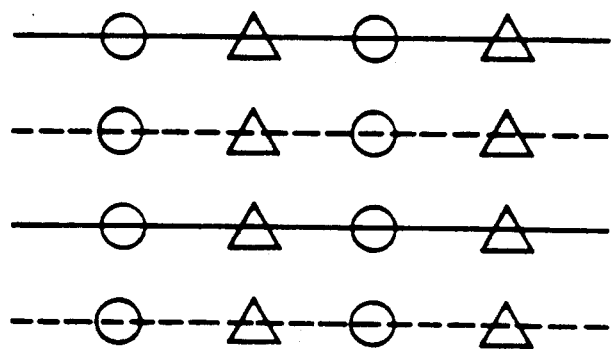
FIGS. 13(a) and 13(b) are diagrams showing other examples of the positional relations among the transmission pixels of the color difference signals $C_N$ and $C_W$, respectively.
Figure 13B:
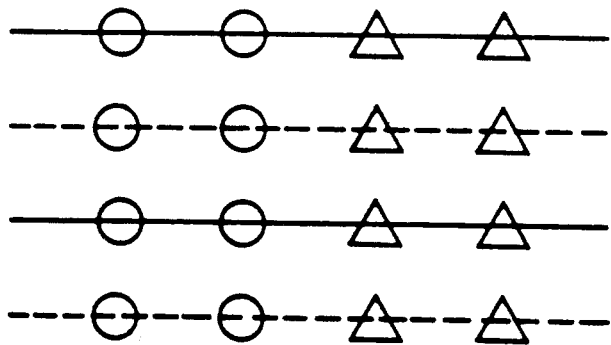

In the above embodiment, field offset subsampling has been used as a subsampling pattern. However, the subsampling pattern is not limited to that. For instance, subsampling patterns as shown in FIGS. 13(a) and 13(b) may be also used. In FIGS. 13(a) and 13(b), solid lines, broken lines, ○, and △ have the same meanings as in FIGS. 4(a) and 4(b).

On the other hand, although the above embodiment has been described with respect to the case where the encoding block has the size of (4×4) pixels, in general, a similar effect is derived when the size of the encoding block is set to (n×m) pixels where (n and m are integers not less than 2). The values of n and m can be arbitrarily determined in accordance with requirements of the encoding system, data compression rate, and the like.

Figure 14:
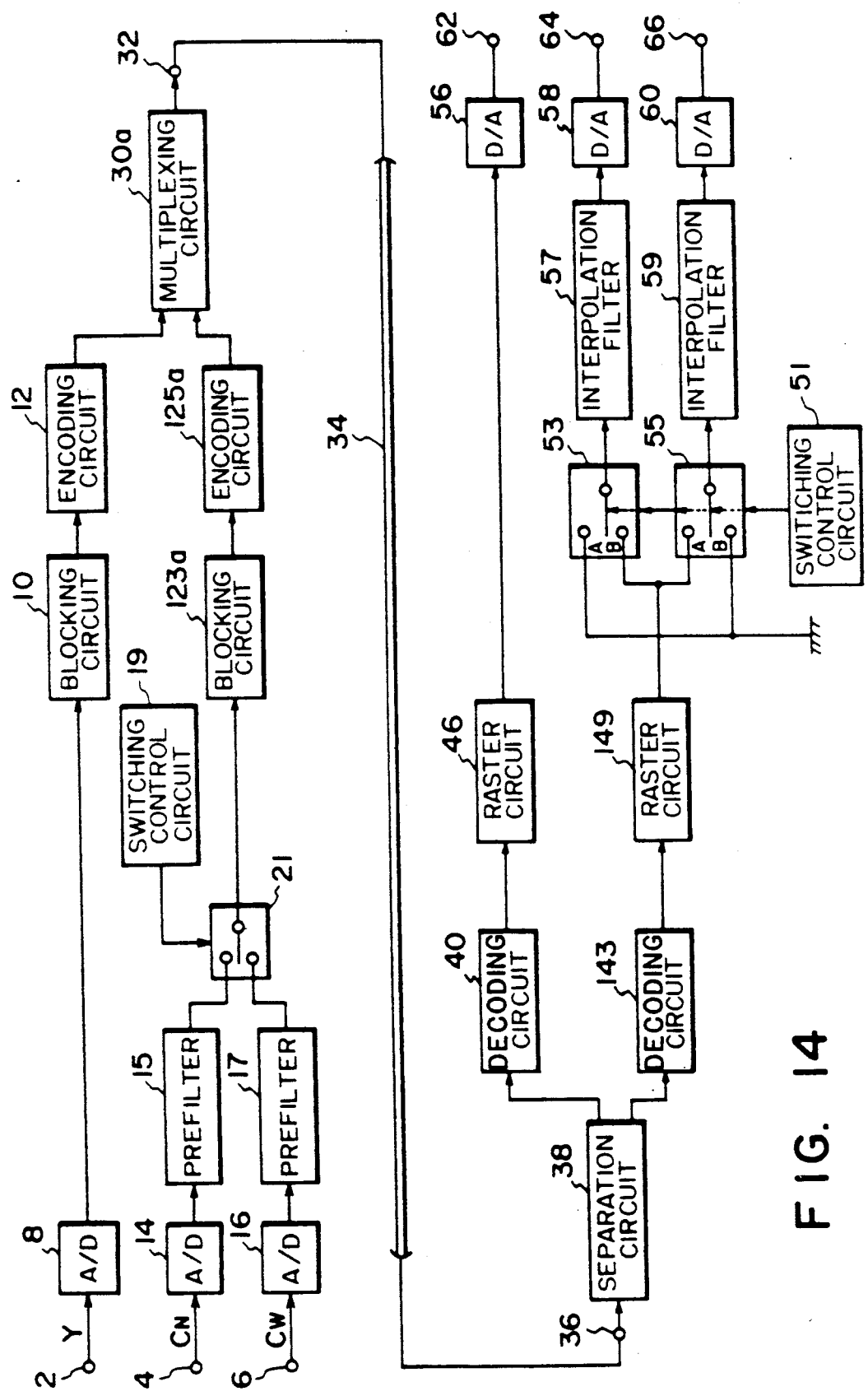
FIG. 14 is a diagram showing a schematic construction of a color video signal transmission system as yet another embodiment of the invention.

FIG. 14 is a diagram showing a schematic construction of a color video signal transmission system as yet another embodiment of the invention. In FIG. 14, the same parts and components as those shown in FIGS. 5 and 12 are designated by the same reference numerals and their descriptions are omitted.

The system of FIG. 14 differs from the system of FIG. 12 with respect to a point that the switch 21 in FIG. 5 is used in place of the data selector 121' in FIG. 12 and a line sequential signal is supplied to a blocking circuit 123a. That is, the line sequential color difference signals $C_N$ and $C_W$ are supplied to the blocking circuit 123a and rearranged every block in a manner similar to the case of the blocking circuit 10 and supplied to an encoding circuit 125a. In the encoding circuit 125a, although the interval between pixels in the horizontal direction differs from that in the case of the luminance signal, the encoding is executed by using the correlation in the encoding block of (4×4) pixels. At this time, when forming a block as shown in FIG. 2, the pixels of the line including pixels numbers 1 and 5 become the $C_W$. The pixels of the line including pixels numbers 9 and 13 become the $C_N$.

The line sequential color difference signal which was block encoded by the encoding circuit 125a is time base multiplexed with the block encoded luminance signal by the multiplexing circuit 30a and is transmitted to the transmission path 34 of a communicating apparatus, magnetic recording/reproducing apparatus, or the like through the terminal 32.

With the above construction, since the line sequential color difference signal has been block encoded, information can be compressed at a high compression rate. On the other hand, in general, it is known that a high correlation exists between the two kinds of color difference signals $C_N$ and $C_W$. By suppressing (reducing) the size of encoding block, it is possible to perform the high efficient encoding. Further, if one encoding block can be reproduced, either or both of the two kinds of color difference signals $C_N$ and $C_W$ can be reconstructed. Therefore, if the encoding process is applied to the digital VTR, even in the case where what is called a high speech search is executed, color recover can be performed. Thus, such a process is suitable for the digital VTR.

The decoding system will now be described.

The decoded luminance signal and line sequential color difference signal are rearranged by the raster circuits 46 and 149 from the order of blocks to the order of scanning lines.

The raster line sequential color difference signal is supplied to the B input terminal of the switch 153 and to the A input terminal of the switch 155. The switching control circuit 50 supplies a rectangular wave signal which is inverted every horizontal scanning period to the switches 153 and 155. The $C_N$ signal in the line sequential color difference signal which is output from the raster circuit 149 is supplied to the interpolation filter 57 and the $C_W$ signal in the line sequentail color difference signal is supplied to the interpolation filter 59. At this time, data of all 0's corresponding to he 0 level is supplied to the interpolation filter 57 for the horizontal scanning period when no $C_N$ signals exists. Data of all 0's corresponding to the 0 level is supplied to the interpolation filter 59 for the horizontal scanning period when no $C_W$ signal exists.

Figure 15:
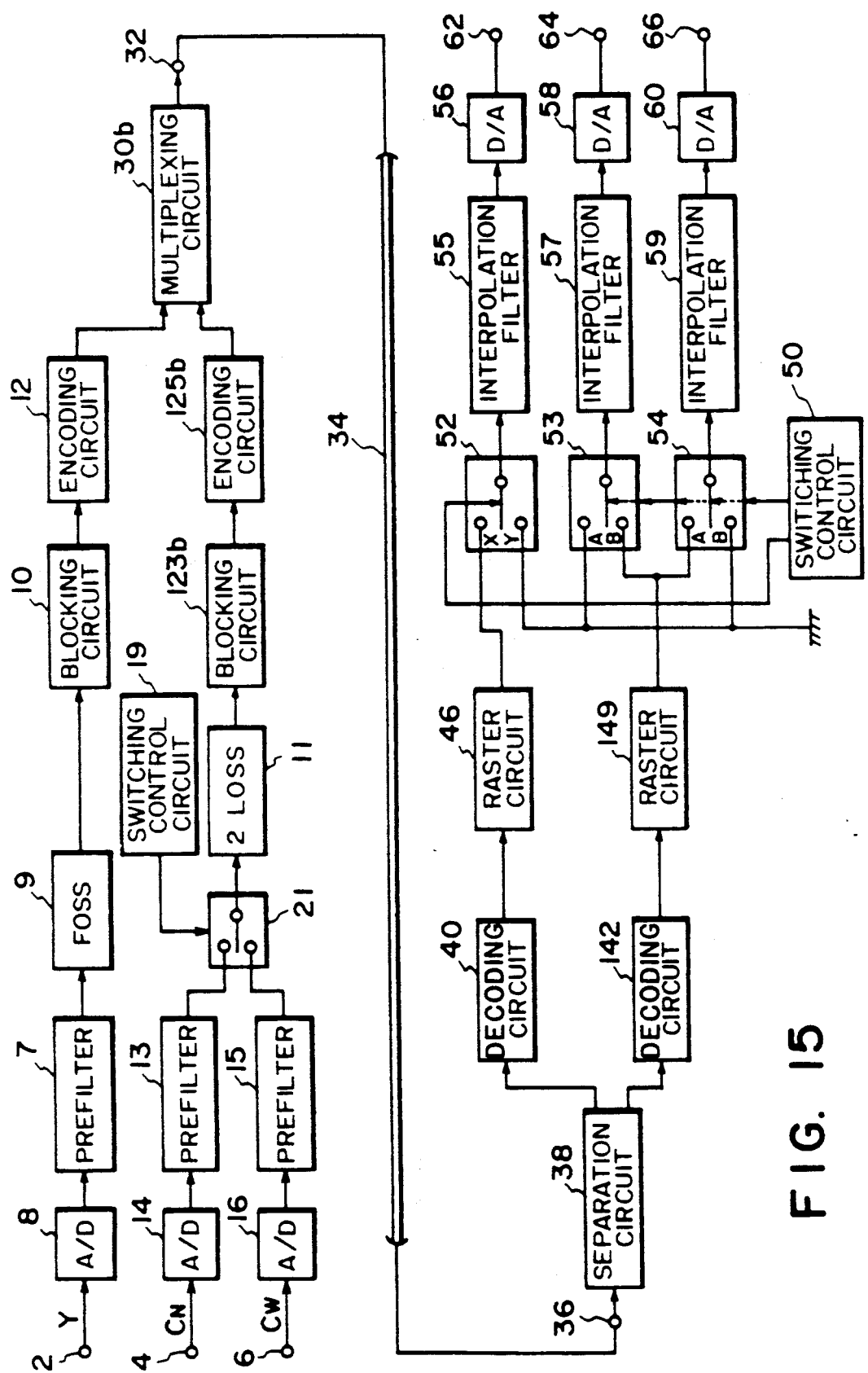
FIG. 15 is a diagram showing a schematic construction of a color video signal transmission system as yet another embodiment of the invention.

FIG. 15 is a diagram showing a schematic construction of a color video signal transmission system as still another embodiment of the invention. In FIG. 15, the same parts and components as those shown in FIGS. 9 and 11 are designated by the same reference numerals and their descriptions are omitted. The system of FIG. 15 differs from the system of FIG. 9 with respect to the point that the output of the LOSS circuit 21 is supplied to a blocking circuit 123b and the blocking process similar to the process executed in the blocking circuit 10 is performed for the line sequential color difference signal. That is, as shown in FIG. 10, the pixels of the line sequential color difference signal after the subsampling are arranged like a lattice. In the case of constructing one encoding block by (4×4) pixels, the interval between pixels in the horizontal direction is four times as large as that of the luminance signal. However, the blocking of (4×4) pixels can be similarly executed. That is, the $C_N$ and $C_W$ signals of the first field of one line (four pixels) and the $C_N$ and $C_W$ signals of the second field of one line (four pixels) are includes in the block, respectively. Assuming that the pixels shown by ○ in FIG. 2 are pixels of the $C_N$ or $C_W$ in the subsampled line sequential color difference signal, the signal of the pixels is input to the blocking circuit 123b in the order 1→2→3→4→17→18→. The signal of the pixels is output from the blocking circuit 123b in the order 1→2→3→4→5→6→7→8→ .... In this case, pixels numbers 1 to 8 in FIG. 2 denote pixels $C_W$ and the pixels of the numbers 9 to 16 denote the pixels of the $C_N$.

An output of the blocking circuit 123b is block encoded by an encoding circuit 125b. The block encoded line sequential color difference signal is time base multiplexed with the block encoded luminance signal by a multiplexing circuit 30b. The time base multiplexed signal is transmitted to the transmission path 34 of a communicating apparatus, magnetic recording/reproducing apparatus, or the like through the terminal 32.

With the foregoing construction, since the subsampled line sequential color difference signal has been block encoded, information can be compressed at a high compression rate. Moreover, since only the same kind of pixels exist in each encoding block, highly efficient band compression can be carried out. And also, since there is generally high correlation between the color difference signals $C_N$ and $C_W$ and the size of encoding block is reduced to a small size, thus, the encoding noise is reduced. On the other hand, in the case of applying the invention to the VTR, if each encoding block can be reproduced, the color reproduction can be executed since both of $C_N$ and $C_W$ signals are certainly and reliably included in the encoding block. Consequently, the processing method of the invention is suitable for the VTR which particularly executes what is called a high speed search.

The decoding system will now be described.

The raster line sequential color difference signal from the raster circuit 149 is supplied to the B input terminal of the switch 153 and to the A input terminal of the switch 155. The subsequent operations are similar to those in the system of FIG. 9.

The luminance signal and color difference signals $C_N$ and $C_W$ which were converted into the analog signals by the D/A converters 56, 58, and 60 are output as component color video signals from the terminals 62, 64, and 66.

In the above embodiment, the field offset subsampling has been used as a subsampling pattern for the luminance signal and the 2-line offset subsampling has been used as a subsampling pattern for the color difference signals. However, the subsampling patterns are not limited to them. It is also possible to use the sampling patterns which differ every color difference signal.

We claim:

1. A color video signal processing device comprising:
   (a) color subsampling means for thinning out pixels for a whole picture plane with respect to each of two kinds of digital color difference signals in accordance with a predetermined rule, said color subsampling means executing a field offset subsampling;
   (b) color blocking means for forming color blocks each consisting of (n×m) pixels (n and m being integers not less than 2) with respect to each of the two kinds of color difference signals whose pixels were thinned out by said subsampling means; and (c) color encoding means for encoding and compressing each of the two kinds of color difference signals whose pixels are thinned out by said subsampling means and divided into said color blocks by said color blocking means, color block by color block.

2. A device according to claim 1, further comprising line sequencing means for line sequencing the two kinds of digital color difference signals and for outputting a line sequential color difference signal.

3. A device according to claim 2, wherein said color subsampling means subsamples the line sequential color difference signal.

4. A device according to claim 1, further comprising:
luminance blocking means for forming luminance blocks each consisting of (p×q) pixels (p and q being integers not less than 2) from a digital luminance signal;
luminance encoding means for encoding and compressing the luminance signal divided into luminance blocks by said luminance blocking means, luminance block by luminance block; and
time base multiplexing means for time base multiplexing a color code encoded and compressed by said color encoding means and a luminance code encoded and compressed by said luminance encoding means.

5. A device according to claim 4, wherein a sampling frequency of said digital luminance signal is twice as high as a sampling frequency of said two kinds of digital color difference signals.

6. A device according to claim 4, further comprising transmitting means for transmitting the signal which was time base multiplexed by said time base multiplexing means onto a transmission path.

7. A color video signal processing device comprising:
(a) color subsampling means for thinning out pixels for a whole picture plane with respect to each of two kinds of digital color difference signals in accordance with a predetermined rule, said color subsampling means executing a line offset subsampling;
(b) color blocking means for forming color blocks each consisting of (n×m) pixels (n and m being integers not less than 2) with respect to each of the two kinds of color difference signals whose pixels were thinned out by said color subsampling means; and
(c) color encoding means for encoding and compressing each of the two kinds of color difference signals whose pixels are thinned out by said color subsampling means and divided into said color blocks by said color blocking means, color block by color block.

8. A device according to claim 7, further comprising line sequencing means for line sequencing the two kinds of digital color difference signals and for outputting a line sequential color difference signal.

9. A device according to claim 8, wherein color subsampling means subsamples the line sequential color difference signal.

10. A device according to claim 7, further comprising:
luminance blocking means for forming luminance blocks each consisting of (p×q) pixels (p and q being integers not less than 2) from a digital luminance signal;
luminance encoding means for encoding and compressing the luminance signal divided into said luminance blocks by said luminance blocking means, luminance block by luminance block; and
time base multiplexing means for time base multiplexing a color code encoded and compressed by said color encoding means and a luminance code encoded and compressed by said luminance encoding means.

11. A device according to claim 10, wherein a sampling frequency of said digital luminance signal is twice as high as a sampling frequency of said two kinds of digital color difference signals.

12. A device according to claim 10, further comprising transmitting means for transmitting the signal which was time base multiplexed by said time base multiplexing means onto a transmission path.

13. A color video signal processing device comprising:
(a) color thinning-out means for thinning out pixels for a whole picture plane with respect to each of two kinds of digital color difference signals in accordance with a predetermined rule;
(b) color blocking means for forming color blocks each consisting of (n×m) pixels (n and m being integers not less than 2) and each having the pixels of both of said two kinds of color difference signals whose pixels were thinned out by said thinning-out means; and
(c) color encoding means for encoding and compressing the two kinds of color difference signals whose pixels are thinned out by said thinning-out means and divided into said color blocks by said color blocking means, color block by color block.

14. A device according to claim 13, wherein said color thinning-out means includes color subsampling means for subsampling each of said two kinds of digital color difference signals.

15. A device according to claim 14, wherein said color subsampling means executes a field offset subsampling.

16. A device according to claim 13, wherein said color thinning-out means includes line sequencing means for line sequencing said two kinds of digital color difference signals and for outputting a line sequential color difference signal.

17. A device according to claim 16, wherein said color thinning-out means further includes color subsampling means for subsampling said line sequential color difference signal.

18. A device according to claim 17, wherein said color subsampling means executes a line offset subsampling.

19. A device according to claim 13, further comprising:
luminance blocking means for forming luminance blocks each consisting of (p×q) pixels (p and q being integers not less than 2) from a digital luminance signal;
luminance encoding means for encoding and compressing the luminance signal divided into said luminance blocks by said luminance blocking means, luminance block by luminance block; and
time base multiplexing means for time base multiplexing a color code from said color encoding means and a luminance code which was encoded by said luminance encoding means.

20. A device according to claim 19, wherein a sampling frequency of said digital luminance signal is twice as high as a sampling frequency of said two kinds of digital color difference signals.

21. A device according to claim 19, further comprising transmitting means for transmitting a signal which was time base multiplexed by said time base multiplexing means onto a transmission path.

* * * * *

UNITED STATES PATENT AND TRADEMARK OFFICE
CERTIFICATE OF CORRECTION

PATENT NO. : 5,067,010
DATED : November 19, 1991
INVENTOR(S) : YOSHIKI ISHII, ET AL.

It is certified that error appears in the above-identified patent and that said Letters Patent is hereby corrected as shown below:

Title page:

IN [56] REFERENCES CITED

OTHER PUBLICATIONS, Under Pratt, "Image" should read --Images--.

IN [57] ABSTRACT

Line 6, "where (n" should read --(where n--.

SHEET 4 OF 12

FIG. 5, "SWITICHING" should read --SWITCHING--.

SHEET 6 OF 12

FIG. 9, "SWITICHING" should read --SWITCHING--.

SHEET 11 OF 12

FIG. 14, "SWITICHING" should read --SWITCHING--.

SHEET 12 OF 12

FIG. 15, "SWITICHING" should read --SWITCHING--.

COLUMN 1

Line 31, "($C_N$, $C_W$) or" should read --($C_N$, $C_W$), or--.

UNITED STATES PATENT AND TRADEMARK OFFICE
CERTIFICATE OF CORRECTION

PATENT NO. : 5,067,010

DATED : November 19, 1991

INVENTOR(S) : YOSHIKI ISHII, ET AL.

It is certified that error appears in the above-identified patent and that said Letters Patent is hereby corrected as shown below:

COLUMN 2

Line 8, "of" (2nd occurrence) should be deleted.

Line 40, "thinned out" should read --thinned-out--.

COLUMN 3

Line 33, "26→2→28→" should read --26→27→28→--.
Line 34, "in 0)" should read --in ◯)--.

COLUMN 4

Line 7, "FIG. 4(a) and 4(b) ◯" should read
--FIG. 4(a) and 4(b), ◯--.

COLUMN 5

Line 36, "in 0)" should read --in ◯)--.
Line 42, "27" should read --27→--.
Line 45, "7" should read --7→--.
Line 55, "FIG. 7 construct" should read
--FIG. 7, construct--.

COLUMN 6

Line 30, "decoding circuit 42a and 44a" should read
--decoding circuits 42a and 44a--.

COLUMN 8

Line 3, "circuit" should read --circuits--.
Line 9, "x side" should read --X side--.

UNITED STATES PATENT AND TRADEMARK OFFICE
CERTIFICATE OF CORRECTION

PATENT NO. : 5,067,010
DATED : November 19, 1991
INVENTOR(S) : YOSHIKI ISHII, ET AL.

It is certified that error appears in the above-identified patent and that said Letters Patent is hereby corrected as shown below:

COLUMN 9

Line 43, "encoding circuit 12" should read --encoding circuits 12--.
    Line 48, "raster circuit" should read --raster circuits--.
    Line 54, "interpolation circuit 52 and 54" should read --interpolation circuits 52 and 54--.
    Line 68, "thinning out" should read --thinning-out--.

COLUMN 10

Line 30, "to" should read --by--.
    Line 48, "where (n" should read --(where n--.

COLUMN 11

Line 21, "efficient" should read --efficiency--.
    Line 26, "high speech" should read --high-speed-- and "recover" should read --recovery--.
    Line 42, "sequentail" should read --sequential--.
    Line 44, "he 0" should read --the 0--.
    Line 57, "LOSS circuit" should read --2LOSS circuit--.

COLUMN 12

Line 2, "includes" should read --included--.
    Line 7, "18→." should read --18→.....--
    Line 10, "pixels $C_w$ and the" should read --the pixels of the $C_w$ and--
    Line 11, "of the" (first occurrence) should be deleted.

UNITED STATES PATENT AND TRADEMARK OFFICE
CERTIFICATE OF CORRECTION

PATENT NO. : 5,067,010

DATED : November 19, 1991

INVENTOR(S) : YOSHIKI ISHII, ET AL.

It is certified that error appears in the above-identified patent and that said Letters Patent is hereby corrected as shown below:

COLUMN 13

Line 56, "wherein color" should read --wherein said color--.

Signed and Sealed this

Twenty-third Day of March, 1993

*Attest:*

STEPHEN G. KUNIN

*Attesting Officer*     Acting Commissioner of Patents and Trademarks